US012768055B2

(12) United States Patent
Choi et al.

(10) Patent No.: US 12,768,055 B2
(45) Date of Patent: Oct. 20, 2026

(54) ELECTROCHEMICAL PHOSPHATE REMOVAL AND RECOVERY CELLS

(71) Applicant: Wisconsin Alumni Research Foundation, Madison, WI (US)

(72) Inventors: Kyoung-Shin Choi, Fitchburg, WI (US); Dohwan Nam, Madison, WI (US); Ryan Belson, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 891 days.

(21) Appl. No.: 18/066,474

(22) Filed: Dec. 15, 2022

(65) Prior Publication Data

US 2024/0200203 A1 Jun. 20, 2024

(51) Int. Cl.
*C25B 1/22* (2006.01)
*C02F 1/46* (2023.01)
(Continued)

(52) U.S. Cl.
CPC ................ *C25B 1/22* (2013.01); *C02F 1/461* (2013.01); *C25B 9/17* (2021.01); *C25B 11/046* (2021.01);
(Continued)

(58) Field of Classification Search
CPC .... C02F 1/461; C02F 2101/105; C02F 1/463; C02F 1/46; C02F 1/4691; C25B 1/02;
(Continued)

(56) References Cited

U.S. PATENT DOCUMENTS 4,632,737 A * 12/1986 Mindler ................ C02F 1/4676 205/342
5,306,400 A * 4/1994 Bradbury ................ C02F 1/467 205/617
(Continued)

FOREIGN PATENT DOCUMENTS

CN 114229969 A 3/2022
CN 115092994 A 9/2022
(Continued)

OTHER PUBLICATIONS

Groterud and Smoczynski "Phosphorous Removal from Water by Means of Electrolysis" Wat. Res. 20 (1986) 667-669 (Year: 1986).*
(Continued)

*Primary Examiner* — Luan V Van
*Assistant Examiner* — Alexander R. Parent
(74) *Attorney, Agent, or Firm* — Bell & Manning, LLC

(57) ABSTRACT

Electrochemical systems and methods for removing and recovering phosphorus, in the form of phosphates, from aqueous solutions are provided. The removal of the phosphates takes place in an electrochemical cell having an electrode that includes bismuth (Bi), zinc (Zn), copper (Cu), iron (Fe), or an oxide thereof. During the removal of phosphates from aqueous solution, the metal (Bi, Zn, Cu, or Fe) and/or metal oxide of the electrode is converted into its corresponding metal phosphate within the electrode via a reversible conversion reaction. The phosphate stored in the electrode during the removal step is subsequently released into a recovery solution via electrochemical reduction of the metal phosphate back into a metal.

21 Claims, 4 Drawing Sheets

(51) Int. Cl.

| | |
|---|---|
| ***C02F 1/461*** | (2023.01) |
| ***C02F 101/10*** | (2006.01) |
| ***C25B 9/17*** | (2021.01) |
| ***C25B 11/046*** | (2021.01) |
| *C02F 1/463* | (2023.01) |

(52) U.S. Cl.

CPC .. *C02F 1/4602* (2013.01); *C02F 2001/46133* (2013.01); *C02F 1/463* (2013.01); *C02F 2101/105* (2013.01); *C02F 2303/18* (2013.01)

(58) Field of Classification Search

CPC .... C25B 9/17; C25B 1/00; C25B 1/01; C25B 1/22; C25C 1/06; C25C 1/12; C25C 1/16; C25C 7/02

USPC ............ 205/64, 66, 549, 704, 741, 742, 761

See application file for complete search history.

(56) References Cited

U.S. PATENT DOCUMENTS

| | | | | |
|---|---|---|---|---|
| 6,174,444 | B1 * | 1/2001 | Smit | C02F 1/463 210/906 |
| 2015/0001159 | A1 | 1/2015 | Barak | |
| 2018/0201524 | A1 * | 7/2018 | Choi | C02F 1/4604 |
| 2021/0188666 | A1 | 6/2021 | Borras et al. | |
| 2022/0289599 | A1 * | 9/2022 | Ben Salah | C02F 1/4672 |

FOREIGN PATENT DOCUMENTS

| | | | |
|---|---|---|---|
| EP | 1496017 | A1 | 1/2005 |
| JP | 2021-100744 | A | 7/2021 |
| KR | 10-2018-0042886 | A | 4/2018 |
| WO | 2010087050 | A1 | 8/2010 |
| WO | 2020209719 | A1 | 10/2020 |

OTHER PUBLICATIONS

Sakakibara and Nakajima "Phosphate removal and recovery by a novel electrolytic process" Water Science and Technology 46 (2002) 147-152 (Year: 2002).*

Lan et al. "Synthesis of ammonia directly from air and water at ambient temperature and pressure." Scientific Reports 3 1145 (2013) (Year: 2013).*

Jang and Choi "Enabling electrochemical N2 reduction to NH3 in the low overpotential region using non-noble metal Bi electrodes via surface composition modification." J. Mater. Chem. A, 2020, 8, 13842 (Year: 2020).*

Ingelsson et al. "Electrode passivation, faradaic efficiency, and performance enhancement strategies in electrocoagulation—a review" Water Research 187 (2020) 116433 (Year: 2020).*

Lei et al. "Electrochemical recovery of phosphorus from wastewater using tubular stainless-steel cathode for a scalable long-term operation" Water Research 199 (2021) 117199 (Year: 2021).*

Vanysek "The Electrochemical Series" in CRC Handbook of Chemistry and Physics, 104th Ed. (Internet Version 2023), John R. Rumble, ed., CRC Press/Taylor & Francis, Boca Raton, FL (Year: 2023).*

Hong et al. "Electrolytic Removal of Phosphorus in Wastewater with Noble Electrode under the Conditions of Low Current and Constant Voltage." Int. J. Electrochem. Sci., 8 (2013) 8557-8571 (Year: 2013).*

Zhang et al. "Phosphate selective recovery by magnetic iron oxide impregnated carbon flow-electrode capacitive deionization (FCDI)" Water Research 189 (2021) 116653 (Year: 2021).*

Wu et al. "Development of novel ZnZr-COOH/CNT composite electrode for selectively removing phosphate by capacitive deionization" Chemical Engineering Journal 439 (2022) 135527 (Year: 2022).*

Ren, Yifan, et al. "Recent advances in electrochemical removal and recovery of phosphorus from water: A review." Environmental Functional Materials (2022). pp. 1-11.

Wu, Jianbo, et al. "An All-Solid-State Phosphate Ion-Selective Electrode Using BiPO4 as a Sensitive Membrane." Int. J. Electrochem. Sci 16 (2021): pp. 1-12.

Wang, Yicheng, et al. "Electrochemically mediated precipitation of phosphate minerals for phosphorus removal and recovery: Progress and perspective." Water research 209 (2022): 117891. pp. 1-15.

Son, Dong-Jin, et al. "Removal of nitrogen and phosphate from fertilizer industry wastewater by magnesium ammonium phosphate formation and electrochemical treatment." Int. J. Electrochem. Sci 14 (2019): 3153-3167. pp. 1-15.

Đuričić, T., B. N. Malinović, and D. Bijelić. "The phosphate removal efficiency electrocoagulation wastewater using iron and aluminum electrodes." Bull Chem Technol Bosnia Herzegovina 47 (2016): 32-38.

Korean Intellectual Property Office. International Search Report and Written Opinion. Feb. 21, 2024.

Extended European Search Report in EP Patent Application No. 23904237.7 dated Mar. 16, 2026, 8 pages.

First Office Action in CN Patent Application No. 202380085911.6 dated Jul. 1, 2026, 10 pages, with English translation, 48 pages.

* cited by examiner

ELECTROCHEMICAL PHOSPHATE REMOVAL AND RECOVERY CELLS

REFERENCE TO GOVERNMENT RIGHTS

This invention was made with government support under 1803496 awarded by the National Science Foundation. The government has certain rights in the invention.

BACKGROUND

As the human population continues to grow, corresponding growth of the agricultural industry is required to feed the world. Phosphorous (P) is one of the main components of fertilizer and is also a critical element used in various industrial manufacturing processes. It is therefore a great concern that global phosphate rock reserves from which P is primarily obtained will be depleted within ~40 to 400 years. (A. R. Jupp et al., *Chem. Soc. Rev.* 50, 87-101 (2021); S. J. van Kauwenbergh, World phosphate rock reserves and resources. (2010). The International Fertilizer Development Center (IFDC).)

After fertilizer is applied to the land and food grown with fertilizer is consumed by humans, phosphate enters natural water sources through runoff of phosphate-containing fertilizers and disposal of phosphate-containing sewage. Phosphate present in water serves as an excess nutrient to cause large algal blooms, resulting in eutrophication, another serious environmental concern caused by phosphate. While various methods have been developed to regulate the phosphate level in wastewater (e.g., metal phosphate precipitation and enhanced biological phosphorus removal), currently, the selective removed of phosphate, which is usually present in a mixture with other species in wastewater, cannot be cost-effectively recovered as a versatile phosphate chemical like $H_3PO_4$. Considering that P reserves are limited and that P mining, $H_3PO_4$ production, and phosphate disposal cause detrimental environmental impacts, it is highly desirable to develop a cost-effective way to recycle wasted phosphate as high-quality $H_3PO_4$ or phosphate solutions to both safeguard the supply of P and to protect the environment.

SUMMARY

Electrochemical systems and methods for removing and recovering phosphorus, in one or more forms of phosphates, from aqueous solutions are provided.

One embodiment of an electrochemical system includes a phosphate removal cell that comprises: a first electrode in a phosphate-containing aqueous solution, the first electrode including a metal, metal oxide, or a combination thereof, wherein the metal, metal oxide, or combination thereof are selected from bismuth, bismuth oxide, zinc, zinc oxide, copper, copper oxide, iron, and iron oxide. The phosphate removal cell may, optionally, include an additional electrode that serves as a cathode (referred to as the cathode for phosphate removal) when the first electrode serves as an anode during phosphate removal. The electrochemical system further includes a phosphate recovery cell that comprises: the phosphatated first electrode, which serves as the cathode during phosphate recovery; and an additional electrode that serves as the anode (referred to as the anode for phosphate recovery).

One embodiment of a method for removing phosphorus, in the form of phosphates, from an aqueous solution containing said phosphates, uses an electrochemical system of a type described herein and includes the steps of: at least partially converting the metal, metal oxide, or combination thereof in the first electrode into a metal phosphate phase in the first electrode, the metal phosphate phase comprising a metal phosphate selected from bismuth phosphates, zinc phosphates, copper phosphates, and iron phosphates; replacing the phosphate ion-containing solution with a second aqueous solution; and applying a voltage across the phosphatated first electrode and the anode for phosphate recovery, wherein the voltage drives the reduction of the metal phosphate phase in the first electrode, releasing phosphate ions into the second solution, and drives an oxidation reaction at the anode for phosphate recovery. The conversion of the metal and/or metal oxides to metal phosphates in the first electrode (referred to herein as the phosphatation of the first electrode) may be carried out electrochemically by pairing the first electrode with a cathode for phosphate removal or may be carried out non-electrochemically.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

DETAILED DESCRIPTION

Figure 1:
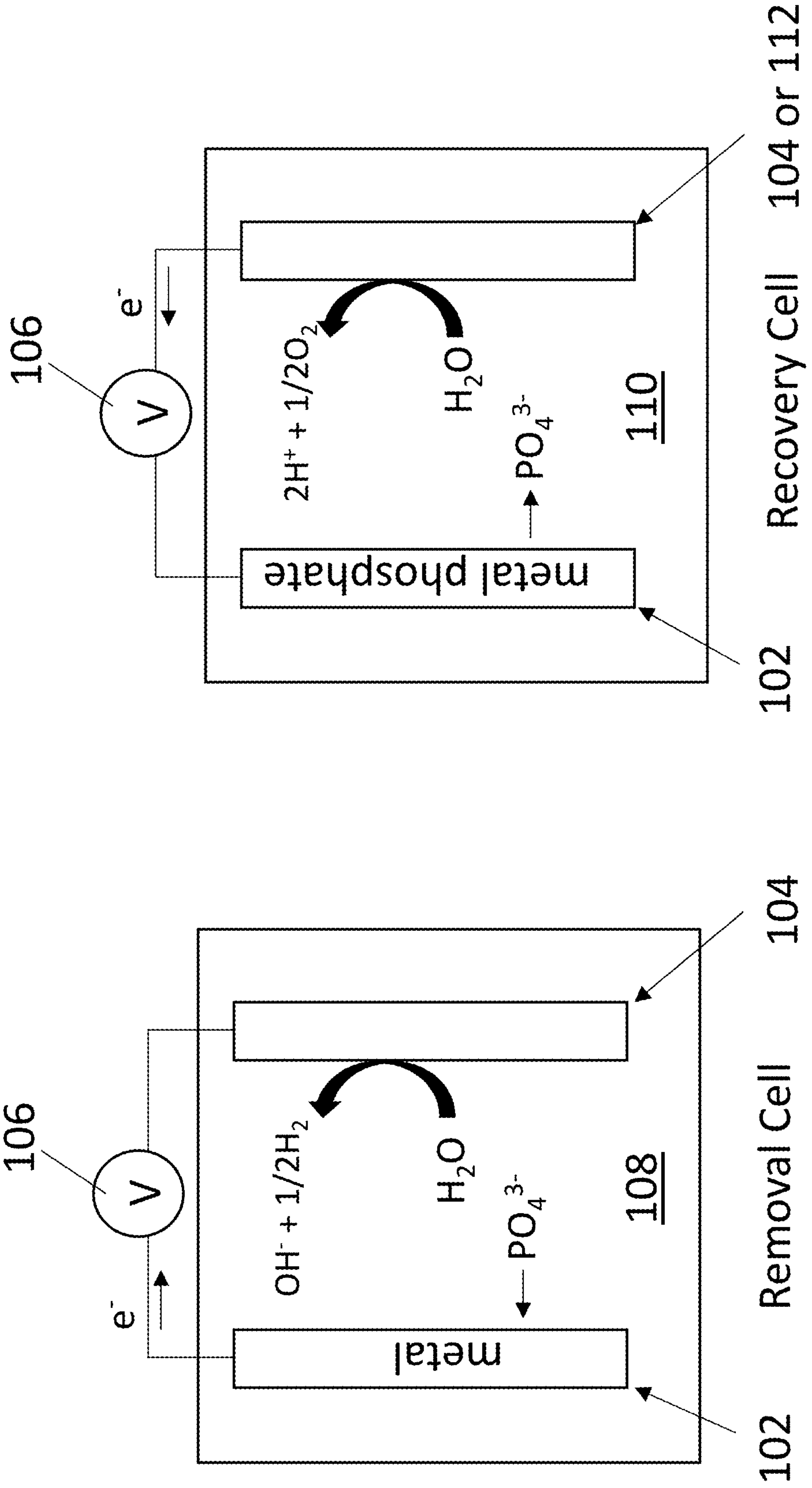
FIG. 1 is a schematic diagram of a phosphate removal (left panel) and recovery (right panel) system.

Electrochemical systems and methods for removing and recovering phosphorus, in one or more forms of phosphates from aqueous solutions are provided. The removal of the phosphates takes place in an electrochemical cell that includes a first electrode comprising or consisting of a metal, a metal oxide, or a combination thereof, wherein the metals or metal oxides are selected from bismuth (Bi), bismuth oxide, zinc (Zn), zinc oxide, copper (Cu), copper oxide, iron (Fe), or iron oxide. In some embodiments of the systems and methods, during the removal of phosphates from aqueous solution, the metal (Bi, Zn, Cu, or Fe) of the electrode is oxidized to one or more corresponding metal phosphates (i.e., one or more bismuth phosphates, one or more zinc phosphates, one or more copper phosphates, or one or more iron phosphates) within the first electrode. In other embodiments of the systems and methods, the metal oxides are converted into one or more corresponding metal phosphates via an ion-exchange. The exact composition of the metal phosphates will vary based by the metal type, solution composition, and removal condition. The phosphates stored in the first electrode during the removal step are subsequently released into a recovery solution via electrochemical reduction of the metal phosphates.

The electrochemical systems and methods described herein have been realized based, at least in part, on the inventors' discovery that electrodes of the metals Bi, Zn, Cu, and Fe or their oxides have the ability to store phosphate by forming metal phosphates within the electrodes and subsequently release the stored phosphates by being converted back to metals upon reduction through a reversible solid-state conversion reaction between the metal (i.e., Bi, Zn, Cu, or Fe) and its corresponding phosphates. Notably, the metal phosphate phases form not just on the surface but in the bulk of the metal electrodes, enabling a high phosphate removal capacity.

The oxidation of the metal in the electrode during the phosphate removal step can be carried out electrochemically when a voltage is applied between a first electrode (i.e., the anode in the phosphate removal step) and a cathode for phosphate removal. However, in certain cases, phosphate removal can also be achieved without applying the voltage. One such case is when dissolved oxygen ($O_2$) or protons in the electrolyte chemically oxidize the metal in the first electrode and the oxidized metal ions in the first electrode form metal phosphate, thus removing phosphate from solution. Alternatively, metal oxide in the first electrode can be converted to metal phosphate by replacing oxide ions with phosphate ions, thus removing phosphate from solution. This reaction is not an oxidation reaction, as the conversion of metal oxide to metal phosphate does not involve the oxidation of metals. Such non-electrochemical removal of phosphate is advantageous because it allows for phosphate removal with no energy input. The non-electrochemical phosphate removal may occur to some degrees even if it is not intended, if the phosphate-containing solution contains dissolved $O_2$ from the air or the first electrode contains metal oxide formed by the air oxidation of non-noble metals in the first electrode. Alternatively, the composition of the first electrode or the aqueous solution can be modified to intentionally promote non-electrochemical phosphate removal. For example, for Zn, which has an oxide that is readily converted to zinc phosphate by non-oxidative anion exchange in concentrated phosphate solutions, a zinc oxide electrode instead of Zn electrode may be used, as non-electrochemical phosphate removal may be as effective as electrochemical phosphate removal under the given solution conditions.

A schematic diagram of an electrochemical system and method for removing and recovering phosphates from an aqueous solution is shown in FIG. 1. In this embodiment of the method, the phosphate removal step is carried out electrochemically. The system includes an electrochemical cell having a first electrode 102 and a cathode for phosphate removal 104 connected by an external circuit or wire and a voltage source 106 configured to apply a voltage across first electrode 102 and cathode 104. First electrode 102 and cathode 104 are in contact with (e.g., submerged in) an aqueous electrolyte solution 108 that contains phosphate ions (e.g., $H_2PO_4^-$, $HPO_4^{2-}$, and/or $PO_4^{3-}$). First electrode 102 contains or is composed of a metal selected from Bi, Zn, Cu, and Fe (generically represented as "metal" in FIG. 1). During the electrochemical phosphate removal step (FIG. 1, left panel), a voltage is applied across the metal electrode 102 and cathode 104 and the metal of the first electrode is oxidized to form one or more metal phosphates (generically represented as "metal phosphate" in FIG. 1), resulting in the removal of phosphate from solution 108, and an electrochemical reduction reaction takes place at cathode 104. (The external voltage applied across first electrode 102 and cathode for phosphate removal 104 to oxidize the metal is referred to herein as a metal-oxidizing voltage.) In the illustrative embodiment of FIG. 1, cathode 104 performs water reduction to $H_2$. To facilitate the hydrogen evolution reaction, cathode 104 can be composed of a hydrogen evolution catalyst, such as platinum, ruthenium, or iridium. However, it should be understood that water reduction is only one illustrative example of a reduction reaction that can be performed by cathode 104. Other more convenient or useful reduction reaction can be carried out instead. By way of illustration, $O_2$ reduction, metal deposition, or ion storage reactions (e.g., $Na^+$ intercalation to an Na-storage electrode) could be carried out at cathode 104. The composition of cathode 104 will vary depending on which reaction will be employed. Once phosphate removal is completed, solution 108 is replaced with a second aqueous solution 110, referred to as a recovery solution. Initial phosphate-containing aqueous solution 108 can be replaced by recovery solution 110 by either removing solution 108 from the electrochemical cell and replacing it with recovery solution 110, thereby converting the phosphate removal cell into a phosphate recovery cell, or by removing phosphatated first electrode 102 from solution 108 and placing it in another electrochemical cell that contains recovery solution 110.

In embodiments of the methods in which the phosphatation of the first electrode and phosphate removal is carried out entirely non-electrochemically, cathode 104 may be omitted. In addition, in embodiments of the methods in which a metal oxide-containing electrode is used, first electrode 102 will contain or be composed of a metal oxide selected from bismuth oxides, zinc oxides, copper oxides, and iron oxides.

In a subsequent phosphate recovery step (FIG. 1, right panel), a reverse voltage is applied across phosphatated first electrode 102 and a counter electrode that serves as an anode for phosphate removal. During phosphate recovery, the metal phosphate phase formed in phosphatated first electrode 102 is reduced back to its metal form, and phosphate ions previously stored in first electrode 102 are released into recovery solution 110. Meanwhile, an electrochemical oxidation reaction takes place at the anode for phosphate recovery. (The external voltage applied across the phosphatated first electrode and the anode for phosphate recovery to reduce the metal phosphate is referred to herein as a metal phosphate-reducing voltage.) If the electrochemical reduction in the phosphate removal step and the electrochemical oxidation in the phosphate recovery step can be carried out by the same electrode, the anode for phosphate recovery may be the same electrode that was used as the cathode for phosphate removal. That is, cathode for phosphate removal 104 may be used as an anode for phosphate recovery during the subsequent phosphate recovery step.

Alternatively, a different anode for phosphate recovery 112 can be used during the electrochemical phosphate recovery step. The composition of the material used for a different anode for phosphate recovery 112 will depend on the reaction being carried out at that anode. In the illustrative embodiment of FIG. 1, anode for phosphate recovery 112 is an oxygen evolution catalyst electrode, such as an oxide of nickel and iron and noble metal oxides (e.g., $RuO_x$ or $IrO_x$). However, it should be understood that this is only one illustrative example of an oxidation reaction that can be performed by the anode for phosphate recovery 104 or 112. By way of illustration, an ion release reaction, such as the deintercalation of a cation (e.g., $Na^+$) from an ion-storage electrode (e.g., a Na-storage electrode) could be carried out at the anode for phosphate recovery. Electrodes 102, 104, and 112 may, optionally, further comprise other materials commonly found in electrodes, including polymeric binders, electrically conductive additives, and/or current collectors or other support substrates.

The electrochemical systems are able to preferentially remove phosphate ions over other anions that are present in the aqueous solution, and the phosphates may be recovered as a phosphoric acid solution or a phosphate solution, depending upon the first electrode used in the phosphate removal. As a result, the electrochemical systems and methods can be used to treat a variety of phosphate ion-containing waste solutions that are not currently recycled to create a sustainable phosphate cycle.

Because the electrochemical phosphate removal cells convert the metal and/or metal oxide of an electrode into a metal phosphate phase, thereby storing the phosphate in the electrode, the electrochemical systems and methods described herein are readily distinguishable from electrocoagulation systems that oxidize a sacrificial metal electrode into its corresponding soluble metal ions, which then react with phosphate ions in solution to form metal phosphates that precipitate out of solution and are collected as a sludge. (In fact, the oxidation of the metal electrode to soluble metal ions is considered an undesirable reaction for the electrochemical systems and methods described herein because it prohibits the sustainable use of the metal electrode.) The present systems and methods are also readily distinguishable from electrosorption systems that use charged electrodes to attract oppositely charged ions from solution via electrostatic attraction. In electrosorption, the oppositely charged ions are temporarily absorbed onto the electrode surfaces in the presence of a bias voltage, but do not form a new phase on or in the electrode and are released upon the removal of the bias voltage. In contrast, the present systems store phosphate via a phase transformation of metals to metal phosphates and/or via phase transformations of metal oxides to metal phosphates, allowing for the storage of phosphate not just on the surface, but also in the bulk of the electrode, and even upon the removal of the bias voltage.

The ability of the present electrochemical phosphate removal methods to selectively remove and store phosphates from solutions that contain a mixture of ions is also a distinguishing feature. The selective removal of phosphate is attributed to the fact that Bi, Zn, Cu, or Fe form insoluble salts with phosphates, while common anions, such as sulfate, nitrate, and chloride, do not form insoluble phases with Bi, Zn, Cu, or Fe. As a result, phosphate can be removed selectively. (One possible exception is Bi, which can form insoluble BiOCl with chloride ions. However, when chloride and phosphate are co-present, the formation of $BiPO_4$ is heavily favored, and the formation of BiOCl is negligible below a pH of 9.5.) In contrast to the present methods, other methods, such as reverse osmosis and electrodialysis non-selectively remove all cations and anions along with phosphate, thereby requiring an additional ion separation step or rendering the recovered materials unusable and/or unrecyclable.

It should be noted that, while phosphates may be the sole or majority product of the oxidation of the metal during the phosphate removal step, metal oxides can form in addition to metal phosphates if not enough phosphates are available at the electrode surface to form metal phosphates. This can occur when a dilute phosphate solution is used and the phosphate at the electrode surface is depleted because the rate of metal phosphate formation is faster than the rate of mass transport of phosphate from the bulk solution to the electrode surface. This can decrease the Faradaic efficiency (FE) for phosphate removal. However, the co-formation of metal oxide is not particularly problematic because metal oxide can be converted back to metal during the phosphate recovery step without introducing any impurity anions into the recovery solution. In order to minimize the formation of metal oxide during the phosphate removal process in a dilute phosphate solution, the metal-oxidizing voltage can be applied only for a short period of time, followed by a resting time with no applied voltage, and this sequence can be repeated instead of applying a continuous metal-oxidizing voltage. During the resting time, the phosphate depleted at the electrode surface can be replenished by phosphate diffusion from the bulk solution and this can ensure more efficient phosphate removal during the next oxidation period.

Another side reaction that can occur, but is desirably avoided, is the continuous dissolution loss of the metal in the electrode. For example, the oxidative dissolution of Zn, Cu, and Fe can occur in acidic solutions (e.g., $pH<2$). Thus, the pH of the solutions used for the phosphate removal and recovery cells should be sufficiently high (e.g., $pH>4$) to prevent the dissolution loss of metal in the electrode.

A unique advantage of Bi and $BiPO_4$ is that both are insoluble and stable in concentrated $H_3PO_4$ solutions having pH values as low as 0.25. Thus, when a $BiPO_4$ electrode is used in the electrochemical recovery of phosphates and the reduction reaction of $BiPO_4$ to Bi is coupled with a water oxidation reaction at the anode for phosphate recovery that generates $H^+$, the phosphates can be recovered as phosphoric acid ($H_3PO_4$ (aq)) in an acidic recovery solution (i.e., a recovery solution having a $pH<7.0$, including recovery solutions having a pH of <6, <5, <4, and <3) without dissolving Bi or $BiPO_4$.

Unlike Bi and $BiPO_4$, the other metals (Zn, Cu, and Fe) and their corresponding metal phosphates are not as stable in strongly acidic solutions. Therefore, slightly acidic, neutral or basic phosphate solutions should be used for the recovery step, and the phosphates will be recovered as high purity concentrated phosphate solutions in slightly acidic, neutral, or basic pH. For purposes of illustration only, the pH of the recovery solution may be in the range from 4 to 14. However, pH values outside of these ranges can be used.

The electrochemical systems and methods may be utilized to remove phosphates from various aqueous solutions, including residential, municipal, and/or industrial wastewater treatment processes and facilities. In order to render the electrochemical removal more efficient, the phosphates in the water optionally may be concentrated prior to phosphate removal. In some embodiments of the methods, the present electrochemical phosphate removal and recovery system is located downstream from another water treatment system that concentrates phosphates in its effluent or other output. For example, the electrochemical phosphate removal and recovery systems described herein can be used downstream of other currently used phosphate removal processes (e.g., chemical precipitation, chemical and electrocoagulation, enhanced biological phosphate removal) that produce phosphate-containing sludges from dilute phosphate-containing wastewater. These phosphate-containing sludges can be collected and dissolved to produce concentrated phosphate solutions from which phosphate can be selectively removed and recovered as high purity $H_3PO_4$ or other high purity phosphate solutions using the electrochemical systems and methods described herein. This is significant because phosphates removed by these other methods are not currently utilized to produce high-quality phosphate chemicals because the metal phosphate precipitates contain various impurities that are difficult to separate in a cost-effective manner.

If the concentrated phosphate solutions used for phosphate removal are prepared by re-dissolving metal phosphate precipitates (e.g., iron phosphate) obtained from chemical or electrochemical coagulation methods, the reduction reaction at the cathode for phosphate removal in the phosphate removal cell can be a metal deposition (e.g., Fe deposition) which recovers the metal ions used at the upstream chemical precipitation or electrocoagulation step, making the overall phosphate removal and recovery processes even more sustainable.

By way of illustration, the phosphate-containing aqueous solutions described herein may have an initial phosphate concentration of at least $10^{-6}$ M, at least $10^{-3}$ M, or at least 0.1 M. For example, phosphate-containing aqueous solutions having an initial phosphate concentration in the range from 0.1 to 1 M may be used. However, phosphate-containing aqueous solutions having higher or lower initial phosphate concentrations can also be used. As used herein, the phrase "initial phosphate concentration" refers to the phosphate concentration in the solution prior to the onset of the phosphate removal step.

EXAMPLES

Example 1: Phosphate Removal and Recovery with a Bismuth Electrode

Figure 2A:
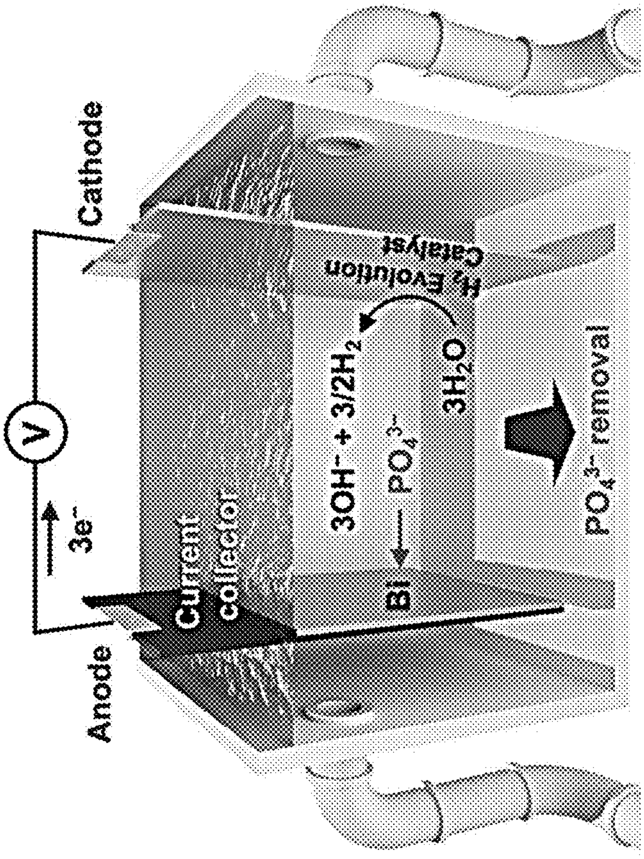
FIGS. 2A-2B show more detailed illustrations of an electrochemical phosphate removal cell that includes a bismuth electrode (FIG. 2A) and the corresponding electrochemical phosphate recovery cell (FIG. 2B) used in the Example.

This Example illustrates a phosphate removal and recovery system that utilizes a Bi electrode. In the phosphate removal cell (FIG. 2A), a Bi electrode serves as the anode and is oxidized to $BiPO_4$, storing phosphate (eq. 1). (The $H_2PO_4$ anion is used in eq. 1 as it is the major species present under the pH condition studied in this example, but the exact phosphate species can vary with the solution pH.) This reaction is coupled with a cathode reaction that reduces water to $H_2$ (eqs. 2-3).

Phosphate Removal Cell

Anode Reaction:

$$Bi\,(s) + H_2PO_4^-(aq) \rightarrow BiPO_4(s) + 2H^+ + 3e^- \quad \text{(eq. 1)}$$

Cathode Reaction:

$$3H^+ + 3e^- \rightarrow 3/2H_2(g) \quad \text{(eq. 2)}$$

Overall Reaction:

$$Bi\,(s) + H_2PO_4^-(aq) + H^+ \rightarrow BiPO_4(s) + 3/2H_2(g) \quad \text{(eq. 3)}$$

Figure 2B:
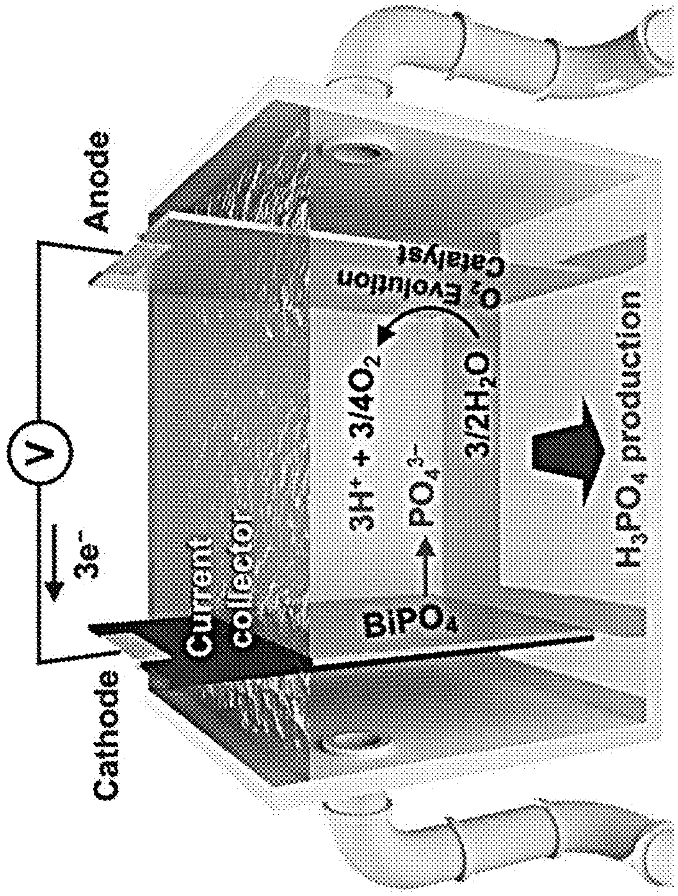

When the conversion of Bi to $BiPO_4$ is completed, the resulting $BiPO_4$ electrode will serve as the cathode in the phosphate recovery cell (FIG. 2B), where it is reduced back to Bi, releasing phosphate to the solution (eq. 4). The anode in this cell oxidizes water to $O_2$ producing $H^+$ (eq. 5). As a result, $H_3PO_4$ is generated and accumulates in the recovery cell without requiring the addition of an acid (eq. 6).

Phosphate Recovery Cell

Cathode Reaction:

$$BiPO_4(s)+3H^++3e^- \rightarrow Bi\,(s)+H_3PO_4\,(aq) \quad \text{(eq. 4)}$$

Anode Reaction:

$$3/2H_2O \rightarrow 3H^+(aq) + 3e^- + 3/4O_2 \quad \text{(eq. 5)}$$

Overall Reaction:

$$BiPO_4(s)+3/2H_2O \rightarrow Bi\,(s)+H_3PO_4(aq)+3/4O_2 \quad \text{(eq. 6)}$$

Figures 3A, 3B, 3C:
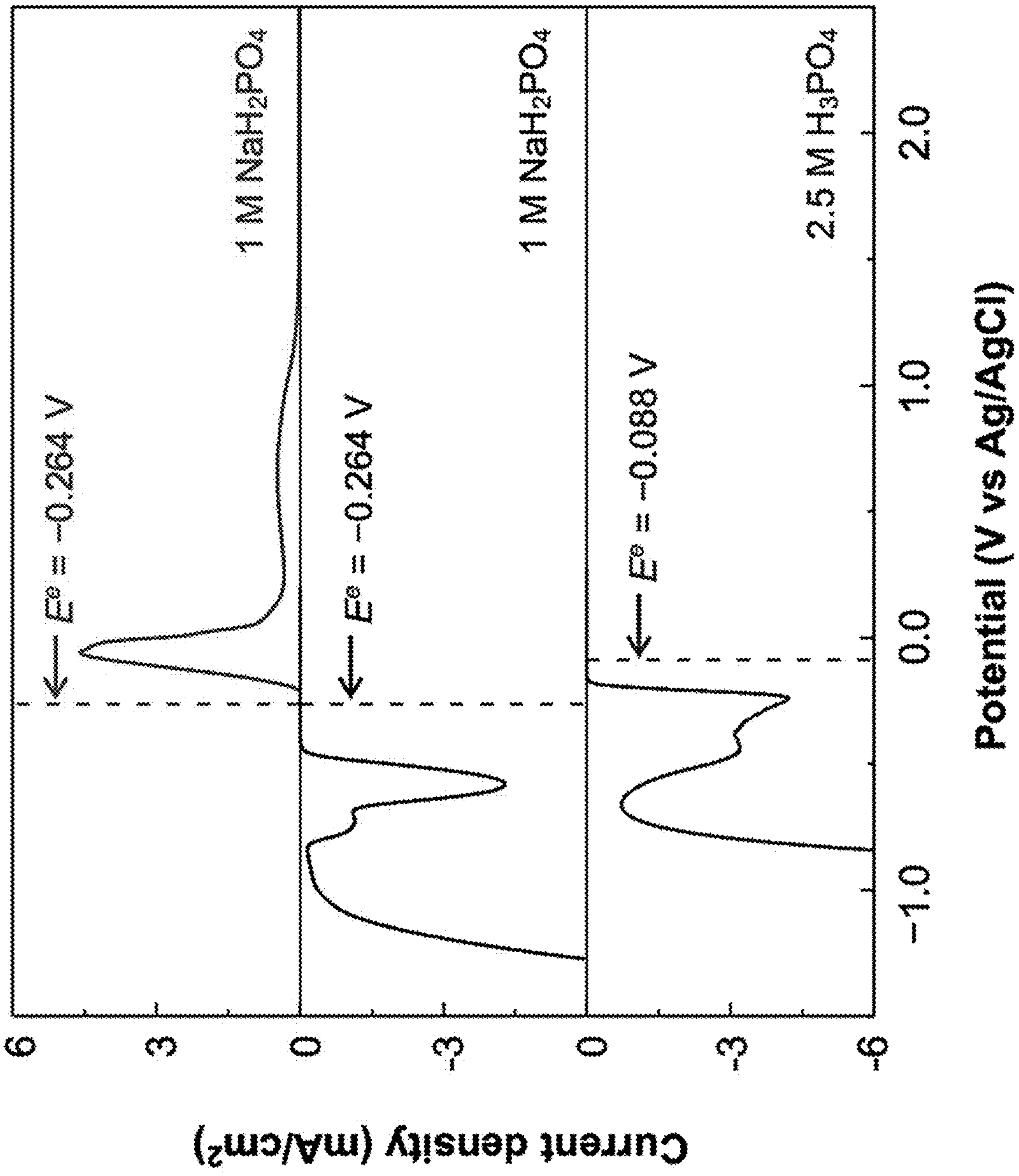
FIG. 3A shows linear sweep voltammetry (LSV) curves for a Bi electrode obtained by sweeping a potential from the open circuit potential (OCP) in the positive direction in 1 M $NaH_2PO_4$. LSVs of a $BiPO_4$ electrode obtained by sweeping the potential from the OCP in the negative direction (FIG. 3B) in 1 M $NaH_2PO_4$ and (FIG. 3C) in 2.5 M $H_3PO_4$ (scan rate, 1 mV/s). The dashed lines indicate the equilibrium reduction potential (V vs Ag/AgCl) of $BiPO_4$ to Bi under each condition.

It was experimentally confirmed that the conversion reaction between Bi and $BiPO_4$ can occur without inducing water oxidation or reduction. The LSV with a Bi electrode is shown in FIG. 3A where the potential was swept from the OCP in the positive direction in 1 M $NaH_2PO_4$ solution (pH 3.98). It shows a sharp anodic peak centered at around −0.05 V and a broad anodic peak centered at around 0.8 V, which are both due to the formation of $BiPO_4$. This postulation is supported by the results of the constant potential phosphatation of Bi and the crystal structure of $BiPO_4$ discussed below. After these two anodic peaks, no other anodic feature attributable to the oxygen evolution reaction (OER) was observed, meaning that on the surface of $BiPO_4$, water oxidation was suppressed. This is highly advantageous as it means that OER will not be able to reduce the FE of the phosphate storage reaction of Bi.

An LSV of a $BiPO_4$ electrode was also recorded where the potential was swept from the OCP in the negative direction (FIG. 3B). It shows two reduction peaks at around −0.58 V and −0.75 V, both of which are due to the reduction of $BiPO_4$ to Bi. The reduction wave for water reduction appears at a more negative potential than these reduction peaks, meaning it is possible to choose a potential to reduce $BiPO_4$ to Bi without inducing water reduction.

An LSV of a $BiPO_4$ electrode in 2.5 M $H_3PO_4$ (pH=0.25) was also recorded to mimic the electrolyte of the phosphate recovery cell where phosphate released from the $BiPO_4$ electrode will be accumulated as a concentrated $H_3PO_4$ solution (FIG. 3C). In this solution, water reduction also occurred at a more negative potential than the reduction of $BiPO_4$ to Bi, meaning water reduction will not interfere with the phosphate release reaction of $BiPO_4$ even in this strongly acidic solution. In fact, the onset of the $BiPO_4$ reduction peak in 2.5 M $H_3PO_4$ is closer to the thermodynamic potential of the Bi/$BiPO_4$ couple than that in 1 M $NaH_2PO_4$, meaning the reduction of $BiPO_4$ has better kinetics in 2.5 M $H_3PO_4$ than in 1 M $NaH_2PO_4$.

Figure 4B:
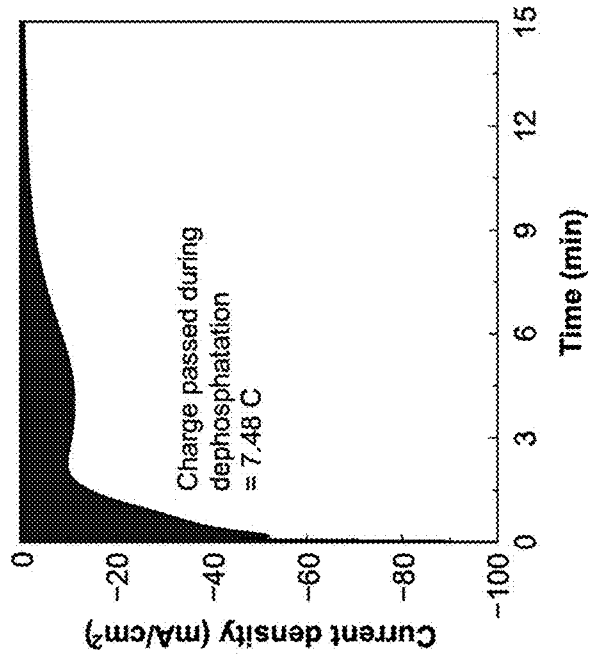
FIG. 4B shows a J-t plot obtained at −0.43 V vs Ag/AgCl for the conversion of $BiPO_4$ to Bi (phosphate recovery) in 2.5 M $H_3PO_4$.
Figure 4A:
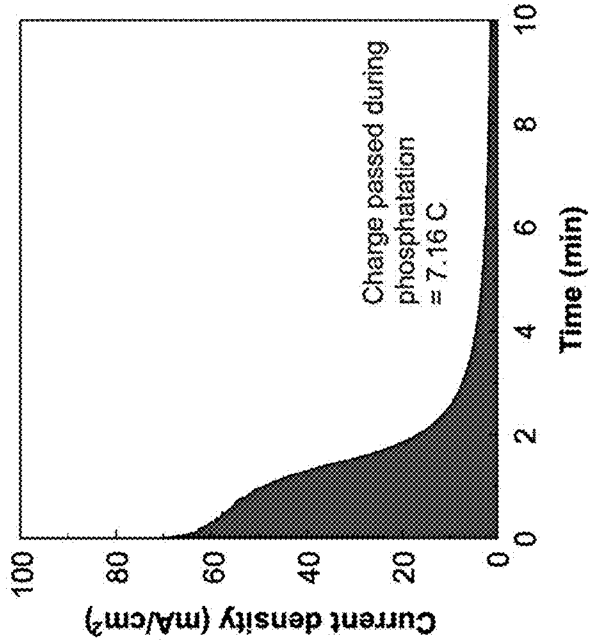
FIG. 4A shows a J-t plot obtained at 0.95 V vs Ag/AgCl for the conversion of Bi to $BiPO_4$ (phosphate removal) in 1 M $NaH_2PO_4$

Next, a constant potential conversion of Bi to $BiPO_4$ was examined at 0.95 V vs Ag/AgCl in 1 M $NaH_2PO_4$ (FIG. 4A)

to quantitatively evaluate how much Bi can be converted to $BiPO_4$ and the FE for the phosphate removal reaction. For this and the rest of the electrode performance tests, a sheet-type Bi electrode was prepared where Bi particles were mixed with a conductive carbon additive and polytetrafluoroethylene (PTFE) binder. This type of fabrication is commonly used for the production of electrodes used in battery applications as it enhances electron and ion conduction throughout the electrode. This fabrication method can also alleviate any pulverization-related issues with the electrodes that may be caused by the electrode volume change during the phosphate storage and release reactions of Bi (i.e., 259% volume expansion for the conversion of Bi to $BiPO_4$).

The area below the J-t plot is equivalent to the total charge passed during the conversion of Bi to $BiPO_4$ (7.1° C.). This charge can be correlated to the amount of Bi converted to $BiPO_4$ during oxidation and compared with the amount of Bi present in the electrode: it was calculated that approximately 56% of the Bi in the Bi electrode was converted to $BiPO_4$ under the given oxidation condition. This result is notable because ~56% conversion implies that $BiPO_4$ is formed not just as a surface passivation layer but also through the conversion of Bi in the bulk.

X-ray diffraction (XRD) patterns of the Bi electrode before the constant potential phosphatation of the Bi showed peaks corresponding to rhombohedral Bi (space group R-3m). (Graphite and PTFE binder peaks were also present.) After oxidation, the intensities of the Bi diffraction peaks in the XRD patterns were diminished and new peaks appeared. These new peaks correspond to trigonal $BiPO_4 \cdot 0.67H_2O$ (space group $P3_121$), confirming that the Bi electrode has indeed stored phosphate via a solid-state conversion reaction. The $BiPO_4 \cdot 0.67H_2O$ possesses large channels along the c-axis that contain water molecules. (B. Romero, et al., *Inorg. Chem.* 33, 1869-1874 (1994).) The size of the channels and the flexible configuration of water molecules makes it possible for phosphate ions and water molecules from solution to diffuse through these channels and continuously convert the underlying bulk Bi to $BiPO_4$ even after the surface of Bi is passivated with a $BiPO_4$ layer, enabling bulk conversion. With 56% conversion of Bi to $BiPO_4$, 1 g of Bi can remove 0.254 g of phosphate.

The FE of the phosphate removal reaction by the Bi electrode was examined by comparing the charge passed by the Bi electrode during oxidation and the actual change in the phosphate concentration of the electrolyte. The result showed a FE of ~108% (Table 1). Such a high FE agrees well with the LSV result, which showed the absence of OER. A phosphate removal efficiency that is slightly higher than 100% is presumably due to chemical oxidation of Bi to $BiPO_4$ by $O_2$, which allows for phosphate removal without consuming electrical charge.

TABLE 1

Faradaic efficiency for phosphate removal in solutions with various initial phosphate concentrations.

| Initial phosphate concentration | Charge passed | Expected phosphate concentration | Experimentally observed phosphate concentration | Faradaic Efficiency |
|---|---|---|---|---|
| 1000 mM | 361.8 C | 937.5 mM | 932 mM (±12) | 108% |
| 500 mM | 180.9 C | 469.75 mM | 469 mM (±7) | 98.0% |
| 100 mM | 36.18 C | 93.75 mM | 96.4 mM (±0.8) | 58.2% |

How the concentration of phosphate affects the FE for phosphate removal was investigated using solutions containing various phosphate concentrations. The results show that the FE for phosphate removal decreases as the phosphate concentration decreases and was calculated to be 98% and 58% at phosphate concentrations of 500 mM and 100 mM, respectively. The decrease in FE with decreasing phosphate concentration is due to oxidation of Bi to $Bi_2O_3$ instead of $BiPO_4$ when phosphate is not sufficient at the interface. This result indicates that the phosphate removal cell will operate more efficiently when the phosphate concentration is high. However, while the formation of $Bi_2O_3$ during phosphatation of Bi in dilute phosphate solutions will decrease the FE for phosphate removal, the presence of $Bi_2O_3$ in the $BiPO_4$ electrode does not create any serious issue for the recovery of phosphate as $H_3PO_4$ in the phosphate recovery cell other than decreasing the FE for the phosphate recovery reaction as well. Thus, although the FE is affected by the phosphate concentration, the Bi/$BiPO_4$ system enables a unique and robust method to recycle phosphate as $H_3PO_4$. (In order to increase the FE for phosphate removal in less concentrated phosphate solutions, the aforementioned process alternating a short oxidizing step and a resting step can be applied.)

A constant potential reduction of $BiPO_4$ to Bi was also tested at −0.43 V vs Ag/AgCl in 2.5 M $H_3PO_4$ and the resulting J-t plot is shown in FIG. 4B. This electrolyte condition was chosen to mimic the electrolyte of the phosphate recovery cell after $H_3PO_4$ has accumulated to form a concentrated $H_3PO_4$ solution. The charge passed during dephosphatation was calculated to be 7.48 C, which is comparable to that used to oxidize Bi to $BiPO_4$ (7.16 C). This result means that $BiPO_4$ can be reversibly and completely reduced back to Bi without any loss of $BiPO_4$ or Bi in such a highly acidic and concentrated phosphate solution. The dephosphatation capacity is slightly higher than the phosphatation capacity because the FE for phosphate removal during phosphatation is slightly higher than 100%; the $BiPO_4$ formed from Bi oxidation by $O_2$ and not by consuming charge is also dephosphatated during reduction, increasing the observed dephosphatation charge. The XRD of the $BiPO_4$ electrode after the reduction reaction showed complete disappearance of the $BiPO_4$ peaks while the peaks of Bi were fully recovered.

Figure 4C:
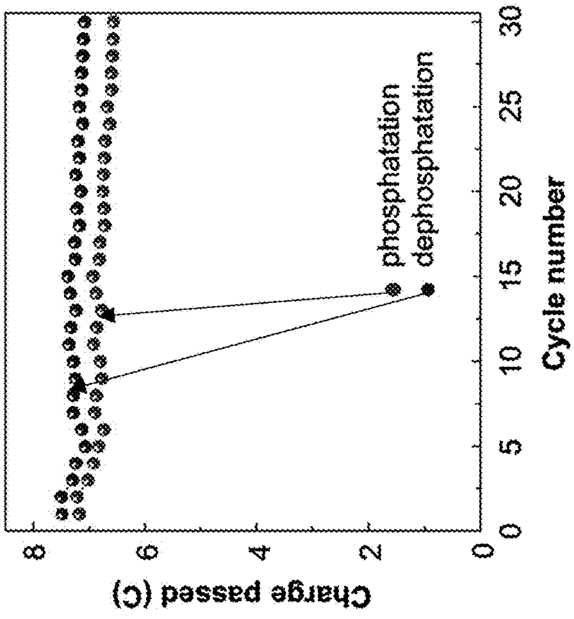
FIG. 4C shows cycling tests of phosphatation of Bi in 1 M $NaH_2PO_4$ and dephosphatation of $BiPO_4$ in 2.5 M $H_3PO_4$ for 30 cycles.

In scanning electron microscopy (SEM) images of the Bi electrode after phosphatation and dephosphatation, the surfaces did not show any noticeable changes after phosphatation and dephosphatation. This confirms that the conversion between Bi and $BiPO_4$ does not induce dissolution and precipitation of the electrode materials and that the sheet-type electrode where each Bi particle is well-mixed with carbon and binders can perform the Bi/$BiPO_4$ conversion uniformly. The conversion between Bi and $BiPO_4$ was repeated using the aforementioned constant potential phosphatation and dephosphatation conditions for 30 cycles (FIG. 4C). After a slight initial variation, the charge passed during the phosphatation and dephosphatation processes are constant, demonstrating that the Bi/$BiPO_4$ electrode can be used sustainably for phosphate removal and phosphate recovery as $H_3PO_4$.

Methods

Materials. $Bi_2O_3$ (99.999%, PURATREM), graphite (99.995%, Sigma-Aldrich), PTFE (60 wt % dispersion in $H_2O$, Sigma-Aldrich), colloidal graphite (isopropanol, Ted Pella, Inc.), $BiCl_3$ (≥98%, Sigma Aldrich), polyethylene glycol (PEG) (molecular weight of 6000, USB Corporation), HCl (Sigma-Aldrich, 37%), NaCl (99%, Macron), $HNO_3$ (70%, Sigma Aldrich), $NaH_2PO_4$ (≥99%, Sigma Aldrich), and $H_3PO_4$ (≥85%, Sigma-Aldrich) were used without further purification. Deionized water (Barnstead E-pure water purification system, resistivity >18 MΩ·cm) was used to prepare all solutions.

Preparation of Bi electrodes. The Bi electrode used for LSV experiments was prepared by electrodeposition, following the procedure reported in previous studies. (D.-H. Nam, et al., *J. Am. Chem. Soc.* 139, 11055-11063 (2017).) An undivided three-electrode cell was used with a titanium (Ti) sheet as the working electrode, a platinum (Pt) sheet as the counter electrode, and a saturated calomel (SCE) electrode as the reference electrode. The Ti sheet was masked to expose an area of 1 $cm^2$. An aqueous solution containing 14 mM $BiCl_3$, 1.4 M HCl, and 2.5 g/L PEG 6000 was used as the plating solution. Potentiostatic deposition was performed by applying a potential of −2.6 V vs. SCE for 2 min, resulting in the deposition of Bi ($Bi^{3+}+3e^- \rightarrow Bi$, $E^o$=0.286 V vs. SHE). During the deposition, the solution was stirred at 300 rpm and the average deposition current was ~900 $mA/cm^2$. After deposition, the Bi electrodes were rinsed with water and dried in air. The resulting Bi electrode has a high surface area macroporous foam structure. (D.-H. Nam, et al., 2017.)

The sheet-type Bi electrodes used for all other electrochemical experiments were prepared through a ball milling process followed by a rolling-press procedure. (D.-H. Nam, et al., *Energy Storage Mater.* 37, 556-566 (2021).) $Bi_2O_3$ and graphite powder were first mixed with a mortar and pestle (ratio of active material to graphite powder was 2.5:1 by mass), and then the mixture was ball milled for 1 h at a rate of 1060 cpm using a high-energy ball mill (8000 M Mixer/Mill from SPEX SamplePrep). The resulting composite was mixed with a PTFE binder (ratio of 10:6 by mass) using water as the solvent to form a thick slurry. The slurry was repeatedly kneaded in a mortar and pestle followed by rolling and pressing into a thin electrode sheet with a thickness of ~100 μm. Finally, the electrode sheet was dried on a hot plate at 80° C. for at least 6 h to remove water and residual organic compounds. The dried electrode sheet was cut into a 1 $cm^2$ electrode, and then attached onto the graphite current collector with colloidal graphite paste to perform electrochemical tests. $Bi_2O_3$ powder instead of Bi powder was used for this process because it was found that the use of $Bi_2O_3$ power results in higher-quality sheet-type electrodes. The resulting $Bi_2O_3$ electrode was converted to a Bi electrode by the following activation/reduction process before using it for phosphate removal. The $Bi_2O_3$ electrode was immersed in 0.6 M NaCl and reduced and oxidized alternatively for about 20 cycles at a current density of ±3 mA $cm^{-2}$ with cutoff potentials of −1.3 V and 0.8 V vs. Ag/AgCl, respectively. This process ended with the reduction cycle to form a Bi electrode. This cycling procedure ensures that the sheet-type electrode is properly wetted and the Bi particles in the electrode are in maximal contact with the electrolyte. The mass of Bi in the electrode was 9.23 $mg/cm^2$.

Characterization. The morphology and crystal structure of the Bi electrodes were examined using a LEO Supra55 VP Scanning Electron Microscope (SEM) at an accelerating voltage of 2 kV and powder X-ray diffractometer (XRD) (Bruker D8 Advanced PXRD, Ni-filtered Cu Kα radiation, λ=1.5418 Å), respectively. Energy dispersive X-ray spectroscopy (EDS) was performed using the same SEM equipped with an EDS (Noran System Seven, Thermo Fisher) at an accelerating voltage of 12 kV. To investigate the phase change of the Bi electrode after oxidation (phosphatation) and reduction (dephosphatation), ex-situ SEM and XRD analysis were performed of the cycled samples. The Faradaic efficiency for phosphate removal by the Bi electrode was calculated by quantifying the amount of P present in solution before and after the phosphate removal process using inductively coupled plasma optical emission spectrometry (ICP-OES) (Agilent 5110).

Electrochemical experiments. LSV and potentiostatic phosphatation/dephosphatation experiments were performed in an undivided three-electrode cell. A Bi electrode was used as the working electrode with a Pt counter electrode and a double junction Ag/AgCl (4 M KCl) reference electrode. The Pt electrode was prepared by sputter coating a 100 nm thick Pt layer over a 20 nm thick Ti adhesion layer onto a clean glass slide (LGA Thin Films). The reusability of the Bi electrode was examined by performing the phosphatation process in 1 M $NaH_2PO_4$ (pH 3.98) and dephosphatation process in 2.5 M $H_3PO_4$ (pH 0.25) repeatedly using the same Bi electrode. The phosphatation and dephosphatation processes were performed potentiostatically at 0.95 V vs Ag/AgCl and −0.43 V vs Ag/AgCl for 10 min and 15 min, respectively. After each process was finished, the Bi electrode was manually lifted from the solution, rinsed with DI water, and moved into another solution for the next process.

Calculation of Equilibrium Redox Potentials for Bi/$BiPO_4$

1) Equilibrium potential in 1 M $NaH_2PO_4$ (pH 3.98)

$$BiPO_4 + 2H^+ + 3e^- \rightleftharpoons Bi + H_2PO_4^-$$

$$E = E^\circ - \frac{0.0591\ V}{n}\log a_{H_2PO_4^-} + \frac{0.0591\ V}{n}\log[H^+]^2 =$$
$$0.090\ V - 0.0197\ V \times (\log a_{H_2PO_4^-}) - 0.0394\ V \times (pH) =$$
$$0.090\ V - 0.0197\ V \times \log(1) - 0.0394\ V \times (3.98) =$$
$$0.090\ V - 0.157\ V = -0.067\ V\ vs.\ SHE \text{ or } -0.264\ V\ vs.\ Ag/AgCl$$

2) Equilibrium potential in 2.5 M $H_3PO_4$ (pH 0.25)

$$BiPO_4 + 3H^+ + 3e^- \rightleftharpoons Bi + H_3PO_4$$

$$E = E^\circ - \frac{0.0591\ V}{n}\log a_{H_3PO_4} + \frac{0.0591\ V}{n}\log[H^+]^3 =$$
$$0.132\ V - 0.0197\ V \times (\log a_{H_3PO_4}) - 0.0591\ V \times (pH) =$$
$$0.132\ V - 0.0197\ V \times \log(2.5) - 0.0591\ V \times (0.25) = 0.132\ V - 0.00784\ V =$$
$$-0.0148\ V = 0.109\ V\ vs.\ SHE \text{ or } -0.088\ V\ vs.\ Ag/AgCl$$

Theoretical Charge Required for Phosphate Removal by Bi

When assuming complete conversion of Bi to $BiPO_4$ by the following reaction, $$Bi(s) + H_2PO_4^-(aq) \rightarrow BiPO_4(s) + 2H^+ + 3e^-$$

The total charge necessary to completely convert Bi to $BiPO_4$ is calculated as follows, $$Q = \frac{nF}{M}$$

$$Q - \frac{3 \cdot 96485.33\ \text{C/mol}}{208.98\ \text{g/mol}} = 1385.09\ \text{C}/g_{Bi}$$

where Q is the charge in Coulombs, F is the Faraday constant (96485.33 C/mol), n is the number of electrons involved with the reaction, and M is the molar mass of Bi. The Bi electrode used in this study contains 9.23 mg of Bi. Therefore, the complete phosphatation of the Bi electrode would require 12.78 C. However, the charge experimentally observed during phosphatation of Bi was 7.16 C, which corresponds to 56% of the total charge expected. This means that approximately 56% of the Bi in the Bi electrode was converted to $BiPO_4$ under the oxidation condition used in this study.

Phosphate Removal Capacity of the Bi Electrode

One mole of phosphate (Molar Mass=94.97 g/mol) can be stored per one mole of Bi (Molar Mass=208.9804 g/mol), meaning the theoretical capacity for phosphate removal per gram Bi is 0.454 $g/g_{Bi}$. With 56% conversion of Bi to $BiPO_4$ in our system, 1 g of Bi can remove 0.254 g of phosphate.

Example 2: Phosphate Removal and Recovery with an Iron Electrode

This Example illustrates a phosphate removal and recovery systems that utilize a Fe electrode.

A sheet-type Fe electrode was prepared as follows: iron nanoparticles, carbon black, and PTFE were mixed in a 100:1:33 ratio using water as the solvent to form a thick slurry. The resulting slurry was processed into a Fe sheet electrode using the procedure described in Example 1 for the preparation of Bi sheet electrodes.

Phosphate was removed from a 0.1 M $NaH_2PO_4$ (pH 7 adjusted with NaOH) solution by immersing the Fe electrode in the solution. Prior to the phosphate removal step, a constant potential of −1.0 V vs. Ag/AgCl was applied to the Fe electrode for 5 min to reduce any iron oxide present on the electrode surface. After this reduction process, a potential of 1.2 V vs. Ag/AgCl was applied for 5 s for phosphate removal, which was followed by 45 seconds of a resting time with no applied potential. This resting time was used to replenish phosphate at the electrode surface, to ensure that more phosphate could be incorporated into the Fe electrode during oxidation. This process of applying a 5 s oxidation voltage pulse followed by a 45 s resting time was repeated until the total accumulated oxidation time reached ~13 min.

The oxidized electrode was analyzed by XRD. Unlike $BiPO_4$, iron phosphates formed by the phosphate removal reaction were amorphous and did not show any Bragg's peaks. Therefore, the chemical formula and structure of iron phosphates formed from the phosphate removal step could not be identified by XRD. However, when the elemental composition of the resulting electrode was analyzed by EDS, the atomic ratio of Fe:P was 1:~0.2, confirming that phosphate was indeed removed from the solution and incorporated into the Fe electrode forming iron phosphates. Since not all Fe present in the Fe electrode (i.e., especially the core part of each Fe particle) was converted into iron phosphate during this short experiment time, the Fe:P ratio obtained by EDS cannot be used to determine the chemical formula of the iron phosphate formed in the Fe electrode. (The Fe amount detected by EDS is the sum of Fe in iron phosphates and Fe in unreacted Fe metal). Possible iron phosphate phases formed include $FePO_4$ and $Fe_3(PO_4)_2$ (and/or their hydrated phases).

For the phosphate recovery step, the iron phosphate electrode obtained from the phosphate removal step was immersed in a 0.01 M $NaH_2PO_4$ (pH 7 adjusted with NaOH) recovery solution and was reduced back to Fe galvanostatically at −15 mA/cm$^2$ for 20 min. The resulting electrode was analyzed by EDS and the result shows that >90% of phosphate stored in the electrode was removed from the electrode, meaning that it was recovered in the recovery solution.

Example 3: Phosphate Removal and Recovery with a Copper Electrode

This Example illustrates a phosphate removal and recovery systems that utilize a Cu electrode.

A sheet-type Cu electrode was prepared as follows: copper nanoparticles, carbon black, and PTFE were mixed in a 3:1:1 ratio using water as the solvent to form a thick slurry. The resulting slurry was processed into a Cu sheet electrode using the procedure described in Example 1 for the preparation of Bi sheet electrodes.

Phosphate was removed from a 0.1 M $NaH_2PO_4$ (pH 7 adjusted with NaOH) solution by immersing the Cu electrode in the solution. Prior to the phosphate removal step, a constant potential of −0.6 V vs. Ag/AgCl was applied to the Cu electrode for 5 min to reduce any copper oxide present on the electrode surface. After this reduction process, a potential of 1.2 V vs Ag/AgCl was applied for 5 s for phosphate removal, which was followed by 45 s of a resting time. This resting time was to replenish phosphate at the electrode surface to ensure that more phosphate could be incorporated into the Cu electrode upon oxidation. This process of applying a 5 s oxidation voltage pulse followed by a 45 s resting time was repeated until the total accumulated oxidation time reached ~13 min.

The oxidized electrode was analyzed by XRD. The newly formed phases appeared to be amorphous, but some crystalline regions showed XRD peaks that matched well with the peaks expected for $Cu_3(PO_4)_2 \cdot 3H_2O$. Thus, $Cu_3(PO_4)_2 \cdot 3H_2O$ was one of the phases formed and it is possible that other amorphous copper phosphates were also formed. The EDS analysis showed that the ratio of Cu:P was 1:~0.36, confirming that phosphate was indeed removed from the solution and incorporated into the Cu electrode. Again, since not all Cu present in the Cu electrode was converted to copper phosphate during this short experiment time, the Cu:P ratio obtained by EDS cannot be used to determine the chemical formula of the copper phosphate formed in the Cu electrode.

For the phosphate recovery step, the copper phosphate electrode obtained from the phosphate removal step was immersed in a 0.01M $NaH_2PO_4$ recovery solution (pH 7 adjusted with NaOH) and was reduced back to Cu galvanostatically at −3 mA/cm$^2$ for 20 min. The resulting electrode was analyzed by EDS and >90% of phosphate stored in the electrode was removed from the electrode, meaning that it is recovered into the recovery solution.

Example 4: Phosphate Removal and Recovery with a Zinc or Zinc Oxide Electrode

This Example illustrates a phosphate removal and recovery systems that utilize a Zn or a ZnO electrode.

First, a sheet-type ZnO electrode was prepared as follows: zinc oxide nanoparticles, carbon black, and PTFE were mixed in a 3:1:2 ratio using water as the solvent to form a thick slurry. The resulting slurry was processed into a ZnO sheet electrode using the procedure described in Example 1 for the preparation of Bi sheet electrodes. Prior to the phosphate removal step, the resulting ZnO sheet electrode was electrochemically reduced to a Zn sheet electrode galvanostatically at −16 mA/cm$^2$ for 1 hour in 0.01 M $NaH_2PO_4$ (pH 7 adjusted with NaOH).

Phosphate was removed from a 0.1 M $NaH_2PO_4$ (with pH adjusted to 7 using NaOH) solution by immersing the Zn electrode in the solution. A potential of 0.6 V Ag/AgCl was applied for 5 s for phosphate removal, which was followed by 25 s of a resting time. This resting time was to replenish phosphate at the electrode surface to ensure that more phosphate could be incorporated into the Zn electrode upon oxidation. This process of applying a 5 s oxidation voltage pulse followed by a 25 s resting time was repeated until the total accumulated oxidation time reached 2 hours.

The oxidized electrode was analyzed by XRD and the newly appeared peaks could be indexed as those of $NaZnPO_4 \cdot H_2O$, indicating that the Zn electrode can remove phosphate from the solution. The EDS analysis showed that the ratio of Zn:P was 1:~0.51. This Zn:P ratio is different from 1:1 expected from the formula of $NaZnPO_4 \cdot H_2$ because not all Zn was converted to $NaZnPO_4 \cdot H_2O$.

For the phosphate removal step, the zinc phosphate electrode obtained from phosphate removal was immersed in a 0.01 M $NaH_2PO_4$ recovery solution (pH 7) and was reduced back to Zn galvanostatically at −16 mA/cm$^2$ for 1 hour. The resulting electrode was analyzed by EDS and P was not detected, indicating that all phosphate stored in the electrode was released from the electrode and recovered into the recovery solution.

It was additionally found that when the ZnO sheet electrode was immersed in the phosphate solution without first reducing ZnO to Zn, the same $NaZnPO_4 \cdot H_2O$ could be formed spontaneously by non-electrochemical anion exchange (replacing oxide with phosphate) because the conversion of ZnO to $NaZnPO_4 \cdot H_2O$ is thermodynamically favorable. The amount of phosphate incorporated into the ZnO electrode by this non-electrochemical method was less than that achieved by applying the metal-oxidzing potential to the pre-reduced Zn electrode. For example, when the ZnO electrode was immersed in a 0.1 M $NaH_2PO_4$ solution (pH 7) for 2 hours, the Zn:P ratio of the resulting electrode was 1:0.32.

However, when a more concentrated phosphate solution (1 M $NaH_2PO_4$, pH 7) was used, the immersion of the ZnO electrode in this solution for 10 min was sufficient to achieve a Zn:P ratio of as high as 1:0.9. It was confirmed that the $NaZnPO_4 \cdot H_2O$ phase formed by non-electrochemical method can also be reduced to Zn by the aforementioned phosphate recovery condition.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" can mean only one or can mean "one or more." Embodiments of the inventions consistent with either construction are covered.

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A method for removing phosphorus from a phosphate ion-containing aqueous solution using an electrochemical cell comprising: a first electrode in the phosphate ion-containing aqueous solution, the first electrode comprising a metal, metal oxide, or a combination thereof, wherein the metal, metal oxide, or combination thereof are selected from zinc, zinc oxide, copper, copper oxide, iron, and iron oxide, the method comprising:

at least partially converting the metal, metal oxide, or combination thereof in the first electrode into a metal phosphate phase in the first electrode, the metal phosphate phase comprising a metal phosphate selected from zinc phosphates, copper phosphates, and iron phosphates;

replacing the phosphate ion-containing aqueous solution with a second aqueous solution;

providing an anode for phosphate recovery in the electrochemical cell; and applying a voltage across the phosphatated first electrode and the anode for phosphate recovery, wherein the voltage drives a reduction of the metal phosphate phase in the first electrode, releasing phosphate ions into the second aqueous solution to form phosphoric acid or a solution comprising soluble phosphate ions, and drives an oxidation reaction at the anode for phosphate recovery.

2. The method of claim 1, wherein the electrochemical cell comprises a cathode for phosphate removal, and the step of at least partially converting the metal, metal oxide, or combination thereof in the first electrode into a metal phosphate phase is carried out via electrochemical oxidation of the metal or metal oxide by applying a voltage across the first electrode and the cathode for phosphate removal.

3. The method of claim 2, wherein the first electrode comprises the copper and the metal phosphate is a copper phosphate.

4. The method of claim 2, wherein the first electrode comprises iron and the metal phosphate is an iron phosphate.

5. The method of claim 2, wherein the first electrode comprises the zinc, the zinc oxide, or the combination thereof and the metal phosphate is a zinc phosphate.

6. The method of claim 2, wherein a water reduction reaction is carried out at the cathode for phosphate removal.

7. The method of claim 2, wherein an oxygen reduction reaction is carried out at the cathode for phosphate removal.

8. The method of claim 2, wherein a metal ion reduction reaction is carried out at the cathode for phosphate removal.

9. The method of claim 8, wherein the metal ion is an iron ion, a zinc ion, or a copper ion.

10. The method of claim 2, wherein the metal phosphates are the sole or majority product of the electrochemical oxidation of the metal.

11. The method of claim 1, wherein the first electrode comprises the zinc, the zinc oxide, or the combination thereof, and the metal phosphate is a zinc phosphate, and further wherein the step of at least partially converting the zinc, zinc oxide, or combination thereof in the first electrode into a zinc phosphate phase is carried out non-electrochemically.

12. The method of claim 1, wherein the phosphate ion-containing aqueous solution comprises metal phosphates obtained from a chemical or electrochemical coagulation process or from a biological phosphate removal process.

13. The method of claim 1, wherein a water oxidation reaction is carried out at the anode for phosphate recovery.

14. A method of removing phosphorus from a phosphate ion-containing acidic aqueous solution using an electrochemical cell comprising: a first electrode in the phosphate ion-containing acidic aqueous solution, wherein the first electrode comprises bismuth or bismuth oxide, the method comprising:

at least partially converting the bismuth or bismuth oxide in the first electrode into a bismuth phosphate phase in the first electrode;

replacing the phosphate ion-containing acidic aqueous solution with a second aqueous solution;

providing an anode for phosphate recovery in the electrochemical cell; and applying a voltage across the phosphatated first electrode and the anode for phosphate recovery, wherein the voltage drives a reduction of the bismuth phosphate phase in the first electrode, releasing phosphate ions into the second aqueous solution, and drives an oxidation reaction at the anode for phosphate recovery.

15. The method of claim 14, wherein the phosphate ion-containing aqueous solution has an initial phosphate ion concentration of at least $1\times10^{-3}$ M.

16. The method of claim 14, wherein the phosphate ion-containing aqueous solution has an initial phosphate ion concentration in the range from 0.1 M to 1 M.

17. The method of claim 14, wherein the phosphate ion-containing acidic aqueous solution comprises an industrial wastewater.

18. The method of claim 14, wherein the electrochemical cell comprises a cathode for phosphate removal, and the step of at least partially converting the bismuth, bismuth oxide, or combination thereof in the first electrode into a bismuth phosphate phase is carried out via electrochemical oxidation of the bismuth by applying a voltage across the first electrode and the cathode for phosphate removal.

19. The method of claim 18, wherein a water reduction reaction is carried out at the cathode for phosphate removal.

20. The method of claim 18, wherein the bismuth phosphates are the sole or majority product of the electrochemical oxidation of the bismuth.

21. A method for removing phosphorus from a phosphate ion-containing aqueous solution using an electrochemical cell comprising: a first electrode in the phosphate ion-containing aqueous solution, the first electrode comprising bismuth or bismuth oxide, the method comprising:

at least partially converting the bismuth or bismuth oxide in the first electrode into a bismuth phosphate phase in the first electrode;

replacing the phosphate ion-containing solution with a second aqueous solution, wherein the second aqueous solution is acidic;

providing an anode for phosphate recovery in the electrochemical cell; and applying a voltage across the phosphatated first electrode and the anode for phosphate recovery, wherein the voltage drives a reduction of the bismuth phosphate phase in the first electrode, releasing phosphate ions into the second aqueous solution and forming phosphoric acid or a solution comprising soluble phosphate ions, and drives an oxidation reaction at the anode for phosphate recovery.

* * * * *